(12) United States Patent
Dossi et al.

(10) Patent No.: US 10,377,843 B2
(45) Date of Patent: Aug. 13, 2019

(54) METHOD FOR THE CONTROLLED POLYMERIZATION OF FLUOROMONOMERS

(71) Applicant: SOLVAY SPECIALTY POLYMERS ITALY S.P.A., Bollate (IT)

(72) Inventors: Marco Dossi, Milan (IT); Giovanni Comino, Monza (IT); Laura Ponta, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 15/310,749

(22) PCT Filed: May 11, 2015

(86) PCT No.: PCT/EP2015/060375
§ 371 (c)(1),
(2) Date: Nov. 11, 2016

(87) PCT Pub. No.: WO2015/173193
PCT Pub. Date: Nov. 19, 2015

(65) Prior Publication Data
US 2017/0081447 A1 Mar. 23, 2017

(30) Foreign Application Priority Data
May 12, 2014 (EP) .................................... 14167927

(51) Int. Cl.
| C08F 2/22 | (2006.01) |
| C08F 2/38 | (2006.01) |
| C08F 14/22 | (2006.01) |
| C08F 14/26 | (2006.01) |
| C08F 214/22 | (2006.01) |
| C08F 214/26 | (2006.01) |
| C08L 27/16 | (2006.01) |

(52) U.S. Cl.
CPC .............. *C08F 214/22* (2013.01); *C08F 2/22* (2013.01); *C08F 2/38* (2013.01); *C08F 14/22* (2013.01); *C08F 14/26* (2013.01); *C08F 214/222* (2013.01); *C08F 214/225* (2013.01); *C08F 214/262* (2013.01); *C08F 214/265* (2013.01); *C08L 27/16* (2013.01); *C08L 2201/52* (2013.01)

(58) Field of Classification Search
None
See application file for complete search history.

(56) References Cited

U.S. PATENT DOCUMENTS

| 2,101,648 A | 12/1937 | Groll |
| 4,035,565 A | 7/1977 | Apotheker et al. |
| 4,243,770 A | 1/1981 | Tatemoto et al. |
| 4,281,092 A | 7/1981 | Breazeale |
| 4,564,662 A | 1/1986 | Albin |
| 4,694,045 A | 9/1987 | Moore |
| 4,745,165 A | 5/1988 | Arcella et al. |
| 4,943,622 A | 7/1990 | Naraki et al. |
| 5,173,553 A | 12/1992 | Albano et al. |
| 5,285,002 A | 2/1994 | Grootaert |
| 5,447,993 A | 9/1995 | Logothetis |
| 5,789,489 A | 8/1998 | Coughlin et al. |
| 6,153,705 A | 11/2000 | Corpart et al. |
| 6,642,318 B1 * | 11/2003 | Chiefari ................ C07C 325/02 525/244 |
| 6,777,513 B1 | 8/2004 | Destarac et al. |
| 6,809,164 B2 | 10/2004 | Destarac et al. |
| 7,317,050 B2 | 1/2008 | Destarac et al. |

(Continued)

FOREIGN PATENT DOCUMENTS

| EP | 199138 A2 | 10/1986 |
| EP | 661304 A1 | 7/1995 |

(Continued)

OTHER PUBLICATIONS

Bruno, "Controlled Radical (Co)polymerization of Fluoromonomers", Macromolecules 2010, 43, 10163-10184. (Year: 2010).*

Perrier S. et al., "Macromolecular design via reversible addition-fragmentation chain transfer (RAFT)/xanthates (MADIX) polymerization", Journal of Polymer Science Part A: Polymer Chemistry, Nov. 15, 2005 vol. 43, No. 22, pp. 5347-5393.

Favier A. et al., "Experimental Requirements for an Efficient Control of Free-Radical Polymerizations via the Reversible Addition-Fragmentation Chain Transfer (RAFT) Process", Macromolecular Rapid Communications, 2006, vol. 27, p. 653-692—Wiley-VCH Verlag GmbH & Co, KGaA, Weinheim.

Kostov G. et al., "First Amphiphilic Poly(vinylidene fluoride-co-3,3,3-trifluoropropene)-b-oligo(vinyl alcohol) Block copolymers as Potential Nonpersistent Fluorosurfactants from Radical Polymerization Controlled by Xanthate", Macromolecules, American Chemical Society, US, Apr. 12, 2011 (Apr. 12, 2011), vol. 44, No. 7, pp. 1841-1855, [retrieved on Mar. 1, 2011].

(Continued)

*Primary Examiner* — Nicole M. Buie-Hatcher (57) ABSTRACT

The invention pertains to a method for emulsion polymerization of at least one fluoromonomer, said method comprising: (i) providing at least one aqueous emulsion comprising at least one surfactant and a monomer mixture [mixture (M)] comprising at least one fluoromonomer [monomer (F)] and optionally at least one additional monomer, and at least one RAFT/MADIX agent; (ii) initiating the polymerization of said monomer mixture in said aqueous emulsion adding at least one radical initiator; (iii) continuing the polymerization by adding additional amounts of said mixture (M) and said RAFT/MADIX agent, until converting the targeted amount of said mixture (M), and (iv) terminating the polymerization and recovering a latex of fluoropolymer [polymer (F)]; wherein the amount of RAFT/MADIX agent is comprised between 0.1 and 0.5% moles, with respect to the total amount of converted monomers of said monomer mixture, and wherein the amount of said RAFT/MADIX agent present in the aqueous emulsion when initiating the polymerization in step (ii) is of at most 50% with respect to the total amount of said RAFT/MADIX agent.

17 Claims, 1 Drawing Sheet

(56) References Cited

U.S. PATENT DOCUMENTS

| | | | | |
|---|---|---|---|---|
| 2004/0192838 A1* | 9/2004 | Destarac | ............... | C08F 2/16 524/800 |
| 2007/0015864 A1 | 1/2007 | Hintzer et al. | | |
| 2007/0015865 A1 | 1/2007 | Hintzer et al. | | |
| 2007/0015866 A1 | 1/2007 | Hintzer et al. | | |
| 2007/0025902 A1 | 2/2007 | Hintzer et al. | | |
| 2012/0004381 A1* | 1/2012 | Rizzardo | ............... | C07C 329/20 526/204 |
| 2012/0309900 A1* | 12/2012 | Noda | ............... | C07C 327/36 525/55 |
| 2013/0090442 A1* | 4/2013 | Pugh | ............... | C08F 26/06 526/263 |
| 2014/0154611 A1 | 6/2014 | Ameduri et al. | | |
| 2015/0011657 A1 | 1/2015 | Destarac et al. | | |
| 2015/0011693 A1* | 1/2015 | Destarac | ............. | C08F 293/005 524/505 |

FOREIGN PATENT DOCUMENTS

| | | | | |
|---|---|---|---|---|
| FR | 2826658 A1 | | 1/2003 | |
| FR | 2983484 A1 | | 6/2013 | |
| FR | 2986235 A1 | * | 8/2013 | ............... C08F 2/30 |
| WO | 9801478 A1 | | 1/1998 | |
| WO | 9858974 A1 | | 12/1998 | |
| WO | 0127176 A1 | | 4/2001 | |
| WO | 2010003929 A1 | | 1/2010 | |
| WO | 2013113750 A1 | | 8/2013 | |

OTHER PUBLICATIONS

Eto M. et al., "Sequential pericyclic reaction of unsaturated xanthates. Intramolecular cycloaddition selectivity of the 2,4-alkadienyl 2-alkenyl sulfides", Tetrahedron (1996), 52(44), 13909-13918.

Bertrand F. et al., "A Xanthate Transfer Radical Process for the Introduction of the Trifluoromethyl Group", Organic Letters (2001), 3(7), 1069-1071—ACS.

Destarac M. et al., "Xanthates as chain-transfer agents in controlled radical polymerization (MADIX): Structural effect of the O-alkyl group", Macromolecular Rapid Communications (2002), 23(17), 1049-1054—Wiley-VCH Verlag GmbH & Co, KGaA, Weinheim.

Adamy M. et al., "Influence of the Chemical Structure of MADIX Agents on the RAFT Polymerization of Styrene", Macromolecules (2003), 36(7), 2293-2301—ACS.

Destarac M. et al., "Recent Advances in the MADIX process", Polymer Preprints (American chemical Society, Division of Polymer Chemistry) (2005), 46(2), 387-388—ACS.

Jean-Baptiste L. et al., "Synthesis of 2,3-trans Di-Substituted Tetrahydrofurans through Sequential Xanthate Radical Addition-Substitution Reactions", Journal of Organic Chemistry (2006), 71(6), 2352-2359—ACS.

Gagosz F. et al., "A xanthate-transfer approach to a-trifluoromethylamines [2-(N-acetylamino)-4,4-dimethoxy-1,1,1-trifluorobutane]", Organic Syntheses (2007), 84, 32-42.

Girard E. et al., "Influence of macromolecular characteristics of RAFT/MADIX poly(vinyl acetate)-based (co)polymers on their solubility in supercritical carbon dioxide", Polymer Chemistry (2011), 2(10), 2222-2230—The Royal Society of Chemistry.

Girard E. et al., "Direct Synthesis of Vinylidene Fluoride-Based Amphiphilic Diblock Copolymers by RAFT/MADIX Polymerization", ACS Macro Letters (2012), 1(2), 270-274—ACS.

Zaggia A. et al., "Recent advances on synthesis of potentially non-bioaccumulable fluorinated surfactants", Current Opinion in Colloid & Interface Science (2012), 17(4), 188-195—Elsevier Ltd.

* cited by examiner

Chain transfer

Reinitiation and Propagation

Chain Equilibrium

Termination

METHOD FOR THE CONTROLLED POLYMERIZATION OF FLUOROMONOMERS

CROSS-REFERENCE TO RELATED APPLICATION

This application is a U.S. national stage entry under 35 U.S.C. § 371 of International Application No. PCT/EP2015/060375filed May 11, 2015, which claims priority to European application No. 14167927.4 filed on May 12, 2014. The entire contents of these applications are explicitly incorporated herein by this reference.

TECHNICAL FIELD

The invention relates to a method for the emulsion polymerization of fluoromonomers under the control of a RAFT/MADIX agent.

BACKGROUND ART

Fluoropolymers are typically prepared by radical polymerization process; emulsion techniques wherein polymerization is effected in an aqueous medium in the presence of a surfactant in the presence of radical initiator for providing a stable dispersion or latex of fluoropolymer particles in water are particularly effective.

Over the past decade, various controlled radical polymerization techniques have been developed. Among these reversible addition-fragmentation chain transfer (RAFT) and macromolecular design via inter-exchange of xanthate (MADIX) have provided an advantageous route to so-called living polymerization processes, see for instance PERRIER, S., et al. Macromolecular design via Reversible Addition-Fragmentation Chain Transfer (RAFT)/Xanthates (MADIX) polymerization. *J. Polym. Sci.: Part A: Polym. Chem.* 2005, vol. 43, p. 5347-5393.

RAFT/MADIX agents are capable to act as a reversible chain transfer agent in free-radical polymerizations, thereby inducing reversible-addition fragmentation transfer reactions to create an equilibrium between propagating radicals (i.e. the growing polymer chain) and so-called dormant species (containing the chain transfer agent fragment) that can become active again.

The use of RAFT or MADIX controlled radical polymerization agents, hereinafter referred to as "RAFT/MADIX agents", has been disclosed for instance WO 98/058974 A (RHODIA CHIMIE) 30 Dec. 1998 and WO 98/01478 A (E.I. DUPONT DE NEMOURS AND COMMONWEALTH SCIENTIFIC AND INDUSTRIAL RESEARCH ORGANIZATION) 15 Jan. 1998.

RAFT/MADIX agents have been proposed for use in emulsion polymerization techniques (see for instance U.S. Pat. No. 677,513 (RHODIA CHIMIE) 17 Aug. 2004); yet, U.S. Pat. No. 7,317,050 (RHODIA CHIMIE) 8 Jan. 2008 discloses a method for manufacturing block copolymers by emulsion polymerization in the presence of RAFT/MADIX agents from ethylenically unsaturated monomers, including possibly fluorinated monomers.

Nevertheless, when adding RAFT/MADIX agents in emulsion polymerization of fluorinated monomers in order to control microstructure of the polymer and introducing end-groups of formula —S—C(S)—Z, the reaction rate is so detrimentally affected, that controlled polymerization method is no actual utility.

There is hence a current shortfall in the art for an emulsion polymerization method under the control of RAFT/MADIX agent which is effective for the manufacture of fluoropolymers.

SUMMARY OF INVENTION

Thus a first objective of the present invention is to provide a method for emulsion polymerization of at least one fluoromonomer, said method comprising:
(i) providing at least one aqueous emulsion comprising at least one surfactant and a monomer mixture [mixture (M)] comprising at least one fluoromonomer [monomer (F)] and optionally at least one additional monomer, and at least one RAFT/MADIX agent;
(ii) initiating the polymerization of said monomer mixture in said aqueous emulsion adding at least one radical initiator;
(iii) continuing the polymerization by adding additional amounts of said mixture (M) and said RAFT/MADIX agent, until converting the targeted amount of said mixture (M), and
(iv) terminating the polymerization and recovering a latex of fluoropolymer [polymer (F)];
wherein the amount of RAFT/MADIX agent is comprised between 0.05 and 5.0% moles, preferably between 0.1 and 0.5% moles, with respect to the total amount of converted monomers of said monomer mixture, and wherein the amount of said RAFT/MADIX agent present in the aqueous emulsion when initiating the polymerization in step (ii) is of at most 50% with respect to the total amount of said RAFT/MADIX agent.

The Applicant has surprisingly found that by reducing the initial amount and differing the addition of further quantities of said RAFT/MADIX agent, it is possible to achieve reasonable reaction rates for fluoromonomers' polymerization and outstanding control on polymer microstructure, hence leading to materials possessing relatively narrow molecular weight distribution, and having their molecular weight steadily increasing with reaction time (hence evidence of living character).

This effect has been found particularly advantageous, in particular when combining this technique with the use of microemulsions through combination of fluorosurfactants and fluorinated fluids, for the manufacture of fluoroelastomers.

Initial introduction of large amounts of RAFT/MADIX agents has been found to substantially repress polymerization activity and to lead to kinetics wherein the living character is totally lost, hence providing broad molecular weight distributions.

DESCRIPTION OF INVENTION

The expression "RAFT/MADIX agent", which for the avoidance of doubt is intended to mean "RAFT or MADIX agent", is used in the present specification to refer to a class of compounds containing the functional group —X(=S)—S—, wherein X is phosphorous or carbon, preferably carbon. MADIX agents are characterized by the presence of the xanthate functional group, namely the —O—C(=S)—S— group.

Figure 1:
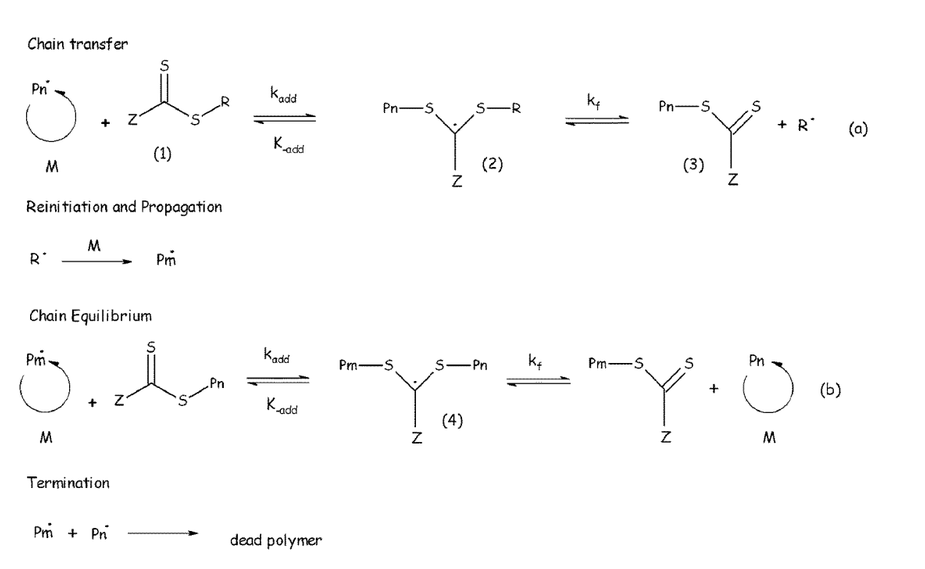
The FIGURE shows the generally accepted mechanism of RAFT/MADIX controlled radical polymerization.

RAFT/MADIX agents are capable to act as a reversible chain transfer agent in free-radical polymerizations, thereby inducing reversible-addition fragmentation transfer reactions to create an equilibrium between propagating radicals (i.e. the growing polymer chain) and so-called dormant species (containing the chain transfer agent fragment) that can become active again. The generally accepted mechanism of RAFT/MADIX controlled radical polymerization is shown in Scheme I.

Any RAFT/MADIX agent known in the art may be used in the inventive method. Non-limiting examples of suitable RAFT/MADIX agents are those disclosed in WO 98/058974 A (RHODIA CHIMIE) 30 Dec. 1998 and in WO 98/01478 A ((E.I. DUPONT DE NEMOURS AND COMMONWEALTH SCIENTIFIC AND INDUSTRIAL RESEARCH ORGANIZATION) 15 Jan. 1998 and in FAVIER, A., et al. Experimental requirements for an efficient control of free-radical polymerizations via the Reversible-Addition Fragmentation chain Transfer (RAFT) process. *Macromol. Rapid Commun.* 2006, vol. 27, p. 653-692.

In a first embodiment of the process of the invention suitable RAFT/MADIX agents include those of any general formulae (I) and (II):

formula (I)

formula (II)

wherein X is carbon or phosphorous, preferably carbon; $R_a$ is a monovalent organic group optionally substituted with one or more hydrophilic groups, $R_b$ is a divalent organic group optionally substituted with one or more hydrophilic groups, and Z is any group that can promote sufficient reactivity of the thiocarbonyl group towards radical addition.

In formulae (I) and (II), X is preferably a carbon atom, that is to say that the RAFT/MADIX agent complies with any general formulae (I') and (II') herein below:

formula (I')

formula (II')

with $R_a$, $R_b$ and Z being as above detailed.

In formula (I), $R_a$ may be selected from $C_1$-$C_{12}$ alkyl, $C_1$-$C_{12}$ alkoxy, aryl or heteroaryl, each of which may be substituted with one or more hydrophilic groups selected from —$CO_2H$, —$CO_2R$, —CN, —$SO_3H$, —$OSO_3H$, —SOR, —$SO_2R$, —$OP(OH)_2$, —$P(OH)_2$, —$PO(OH)_2$, —OH, —OR, —($OCH_2$—$CHR^0$)$_w$—OH, —($OCH_2$—$CHR^0$)$_w$—OR, —$CONH_2$, —$CONHR^1$, —$CONR^1R^2$, —$NR^1R^2$, —$NR^1R^2R^3$, where R is selected from $C_1$-$C_{12}$ alkyl; w is an integer from 1 to 10; $R^0$ is selected from hydrogen or R; $R^1$, $R^2$ and $R^3$ are independently selected from $C_1$-$C_{12}$ alkyl and aryl which are optionally substituted with one or more hydrophilic substituent selected from —$CO_2H$, —$CO_2R$, —CN, —$SO_3H$, —$OSO_3H$, —$SO_2R$, —OH, —($OCH_2CHR^0$)$_w$—OH, —$CONH_2$, —SOR and $SO_2R$, and salts thereof, wherein R, $R^0$ and w are as defined above.

Preferably $R_a$ is selected, without limitation, from the group consisting of: —$CH(CH_3)CO_2H$, —$CH(CH_3)CO_2CH_3$, —$CH(CH_3)CO_2CH_2CH_3$, —$CH(CH_3)CO_2CH(CH_3)_2$, —$CH(CO_2H)CH_2CO_2H$, —$CH(CO_2CH_3)CH_2CO_2CH_3$, —$CH(CO_2CH_2CH_3)CH_2CO_2CH_2CH_3$, —$CH(CO_2CH(CH_3)_2)CH_2CO_2CH(CH_3)_2$, —$C(CH_3)_2CO_2H$, —$C(CH_3)_2CO_2CH_3$, —$C(CH_3)_2CO_2CH_2CH_3$, —$C(CH_3)_2CO_2CH(CH_3)_2$, —$CH_2(C_6H_5)$, —$C(CN)(CH_3)CO_2H$, —$C(CN)(CH_3)CO_2CH_3$, —$C(CN)(CH_3)CO_2CH_2CH_3$, —$C(CN)(CH_3)CO_2CH(CH_3)_2$, —$C(CN)(CH_3)(CH_2)_2CO_2H$, —$C(CN)(CH_3)(CH_2)_2CO_2CH_3$, —$C(CN)(CH_3)(CH_2)_2CO_2CH_2CH_3$, and —$C(CN)(CH_3)(CH_2)_2CO_2CH(CH_3)_2$.

In formula (II), $R_b$ may be selected from divalent $C_1$-$C_{12}$ aliphatic, aryl or heteroaryl groups, each of which may be substituted with one or more hydrophilic groups selected from —$CO_2H$, —$CO_2R$, —CN, —$SO_3H$, —$OSO_3H$, —SOR, —$SO_2R$, —$OP(OH)_2$, —$P(OH)_2$, —$PO(OH)_2$, —OH, —OR, —($OCH_2$—$CHR^0$)$_w$—OH, —($OCH_2$—$CHR^0$)$_w$—OR, —$CONH_2$, —$CONHR^1$, —$CONR^1R^2$, —$NR^1R^2$, —$NR^1R^2R^3$, where R is selected from $C_1$-$C_{12}$ alkyl; w is an integer from 1 to 10; $R^0$ is selected from hydrogen or R; $R^1$, $R^2$ and $R^3$ are independently selected from $C_1$-$C_{12}$ alkyl and aryl which are optionally substituted with one or more hydrophilic substituent selected from —$CO_2H$, —$CO_2R$, —CN, —$SO_3H$, —$OSO_3H$, —$SO_2R$, —OH, —($OCH_2CHR^0$)$_w$—OH, —$CONH_2$, —SOR and $SO_2R$, and salts thereof, wherein R, $R^0$ and w are as defined above.

Preferably $R_b$ is selected, without limitation, from the group consisting of: —($CH_2$)$_p$—, with p being an integer of 1 to 12, preferably of 1 to 6, —$CH(CH_3)$—$CH_2$—$CH_2$—, —$CH(C_2H_5)$—$CH_2$—, —$CHCO_2H$—$CH_2$—, —$CH(CO_2CH_3)$—$CH_2$—, —$CH(CO_2CH_2CH_3)$—$CH_2$—, —$CH(CO_2CH(CH_3)_2)$—$CH_2$—, —$CH(CO_2H)CH(CO_2H)$—, —$CH(CO_2CH(CH_3)_2)CH(CO_2CH(CH_3)_2)$—, —$CH(CO_2CHCH_3)CH(CO_2CHCH_3)$—, —$CH(CO_2CH_2CH_3)CH(CO_2CH_2CH_3)$—, —($CH_2$)$_{p'}$—$CH(C_6H_5)$—($CH_2$)$_{p''}$— with p' and p", equal to or different from each other, being 0 or an integer of 1 to 6, —($CH_2$)$_{q'}$—$CH(CN)$—($CH_2$)$_{q''}$—, —($CH_2$)$_{q'}$—$C(CN)(CH_3)$—($CH_2$)$_{q''}$—, with q' and q", equal to or different from each other, being 0 or an integer of 1 to 6.

As used herein, the terms "aryl" and "heteroaryl" refer to any substituent which includes or consists of one or more aromatic or heteroaromatic ring respectively, and which is attached via a ring atom. The rings may be mono or polycyclic ring systems, although mono or bicyclic 5 or 6 membered rings are preferred. The term "alkyl", used either alone or in combination, as in "alkenyloxyalkyl", "alkylthio", "alkylamino" and "dialkylamino" denotes straight chain, branched or cyclic alkyl, preferably $C_1$-$C_{20}$ alkyl or cycloalkyl. The term "alkoxy" denotes straight chain or branched alkoxy, preferably $C_1$-$C_{20}$ alkoxy. Examples of alkoxy include methoxy, ethoxy, n-propoxy, isopropoxy and the different butoxy isomers. The term "alkenyl" denotes groups formed from straight chain, branched or cyclic alkenes including ethylenically mono-, di- or poly-unsaturated alkyl or cycloalkyl groups as previously defined, preferably $C_2$-$C_{20}$ alkenyl. The term "acyl" either alone or in combination, as in "acyloxy", "acylthio", "acylamino" or "diacylamino", denotes carbamoyl, aliphatic acyl group and acyl group containing an aromatic ring, which is referred to as aromatic acyl or a heterocyclic ring which is referred to as heterocyclic acyl, preferably $C_1$-$C_{20}$ acyl.

In formulae (I), (I') or (II), (II') above Z, equal to or different from each other at each occurrence may be selected among optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O)(OR$^4$)$_2$], dialkyl- or diaryl-phosphinyl [—P(=O)R$^4_2$], where R$^4$ is selected from the group consisting of optionally substituted $C_1$-$C_{18}$ alkyl, optionally substituted $C_2$-$C_{18}$ alkenyl, optionally substituted aryl, optionally substituted heterocyclyl, optionally substituted arylalkyl, optionally substituted alkaryl, optionally substituted acylamino, optionally substituted acylimino, optionally substituted amino, a polymer chain formed by any mechanism, for example polyalkylene oxide polymers such as water soluble polyethylene glycol or polypropylene glycol, and alkyl end capped derivatives thereof. Optional substituents for R$^4$ and Z groups include epoxy, hydroxy, alkoxy, acyl, acyloxy, carboxy (and its salts), sulfonic acid (and its salts), alkoxy- or aryloxy-carbonyl, isocyanato, cyano, silyl, halo, and dialkylamino.

Preferably, Z is selected among optionally substituted alkoxy, optionally substituted aryloxy, optionally substituted alkylthio, optionally substituted arylalkylthio, dialkoxy- or diaryloxy-phosphinyl [—P(=O)(OR$^4$)$_2$], dialkyl- or diaryl-phosphinyl [—P(=O)R$^4_2$], where R$^4$ is as defined above.

More preferably Z is selected, without limitation, from the group consisting of: —OR$^5$, —SR$^5$, where R$^5$ is an optionally substituted $C_1$-$C_{20}$ alkyl, —NR$^6_2$ wherein each of R$^6$, equal to or different from each other, is selected from optionally substituted $C_1$-$C_{20}$ and alkyl optionally substituted aryl, and wherein e is an integer from 2 to 4.

Most preferably, Z is selected, without limitation, from the group consisting of —SCH$_2$(C$_6$H$_5$), —S(CH$_2$)$_u$CO$_2$H wherein u is an integer from 2 to 11, —SC$_z$H$_{2z+1}$, —OC$_z$H$_{2z+1}$, wherein z is an integer from 1 to 12, preferably from 2 to 12, such as 2, 3, 4, 6, 8, 10, 12, —SCH$_2$CH$_2$OH, —OCH$_2$CF$_3$, —OCH$_2$CH$_3$, —N(C$_6$H$_5$)(CH$_3$).

The mixture (M) comprises at least one fluoromonomer. Monomer mixtures comprising more than one fluoromonomer are generally employed in the method of the present invention.

The expression "fluoromonomer" is used herein according to its usual meaning, that is to say for designating an ethylenically unsaturated monomer comprising at least one fluorine atom.

The fluoromonomer is selected generally from the group consisting of:
  $C_2$-$C_8$ perfluoroolefins, such as tetrafluoroethylene (TFE), hexafluoropropene (HFP);
  $C_2$-$C_8$ hydrogen-containing fluoroolefins, such as vinyl fluoride, 1,2-difluoroethylene, vinylidene fluoride (VDF), trifluoroethylene (TrFE), pentafluoropropylene, and hexafluoroisobutylene;
  (per)fluoroalkylethylenes complying with formula CH$_2$=CH—R$_{f0}$, in which R$_{f0}$ is a $C_1$-$C_6$ (per)fluoroalkyl or a $C_1$-$C_6$ (per)fluorooxyalkyl having one or more ether groups;
  chloro- and/or bromo- and/or iodo-$C_2$-$C_6$ fluoroolefins, like chlorotrifluoroethylene (CTFE);
  fluoroalkylvinylethers complying with formula CF$_2$=CFOR$_{f1}$ in which R$_{f1}$ is a $C_1$-$C_6$ fluoro- or perfluoroalkyl, e.g. —CF$_3$, —C$_2$F$_5$, —C$_3$F$_7$;
  hydrofluoroalkylvinylethers complying with formula CH$_2$=CFOR$_{f1}$ in which R$_{f1}$ is a $C_1$-$C_6$ fluoro- or perfluoroalkyl, e.g. —CF$_3$, —C$_2$F$_5$, —C$_3$F$_7$;
  fluoro-oxyalkylvinylethers complying with formula CF$_2$=CFOX$_0$, in which X$_0$ is a $C_1$-$C_{12}$ oxyalkyl, or a $C_1$-$C_{12}$ (per)fluorooxyalkyl having one or more ether groups, like perfluoro-2-propoxy-propyl;
  fluoroalkyl-methoxy-vinylethers complying with formula CF$_2$=CFOCF$_2$OR$_{f2}$ in which R$_{f2}$ is a $C_1$-$C_6$ fluoro- or perfluoroalkyl, e.g. —CF$_3$, —C$_2$F$_5$, —C$_3$F$_7$ or a $C_1$-$C_6$ (per)fluorooxyalkyl having one or more ether groups, like —C$_2$F$_5$—O—CF$_3$;
  functional fluoro-alkylvinylethers complying with formula CF$_2$=CFOY$_0$, in which Y$_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said Y$_0$ group comprising a carboxylic or sulfonic acid group, in its acid, acid halide or salt form;
  fluorodioxoles, of formula:

wherein each of R$_{f3}$, R$_{f4}$, R$_{f5}$, R$_{f6}$, equal or different each other, is independently a fluorine atom, a $C_1$-$C_6$ fluoro- or per(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

The mixture (M) may comprise at least one additional monomer different from monomer (F), that is to say a monomer free from fluorine, otherwise generally referred to as a hydrogenated monomer. Examples of hydrogenated monomers are notably $C_2$-$C_8$ non-fluorinated olefins (Ol), in particular $C_2$-$C_8$ non-fluorinated alpha-olefins (Ol), including ethylene, propylene, 1-butene; diene monomers; styrene monomers; with alpha-olefins, as above detailed, being typically used.

The method of the invention is suitable for the manufacture of a large variety of fluoropolymers, including notably non-melt processable TFE polymers (including PTFE homopolymers and its copolymers comprising low amounts of perfluorinated comonomers), thermoplastic fluoropolymers (e.g. VDF homopolymers and its plastomeric copolymers, copolymers of ethylene with CTFE, ETFE, and mixtures thereof, thermoplastic copolymers of TFE and PAVE, thermoplastic copolymers of TFE and HFP), and fluoroelastomers.

Particular combinations of monomers (F) which can be used as mixtures (M) in the method of the present invention, in particular for manufacturing fluoroelastomers, are preferably:

(1) vinylidene fluoride (VDF) containing monomers mixtures, in which VDF is mixed with at least one comonomer different from VDF and selected from the group consisting of:
(a) $C_2$-$C_8$ perfluoroolefins, such as tetrafluoroethylene (TFE), hexafluoropropylene (HFP);
(b) hydrogen-containing $C_2$-$C_8$ fluoro-olefins, such as vinyl fluoride (VF), trifluoroethylene (TrFE), perfluoroalkyl ethylenes of formula $CH_2=CH-R_f$, wherein $R_f$ is a $C_1$-$C_6$ perfluoroalkyl group;
(c) $C_2$-$C_8$ chloro and/or bromo and/or iodo-fluoroolefins such as chlorotrifluoroethylene (CTFE);
(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;
(f) (per)fluorodioxoles having formula:

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;
(g) (per)fluoro-methoxy-vinylethers (MOVE, hereinafter) having formula:

$$CFX_2=CX_2OCF_2OR''_f$$

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2=F$, H; preferably $X_2$ is F and $R''_f$ is $-CF_2CF_3$ (MOVE1); $-CF_2CF_2OCF_3$ (MOVE2); or $-CF_3$ (MOVE3);
(h) $C_2$-$C_8$ non-fluorinated olefins (Ol), for example ethylene and propylene; and
(2) tetrafluoroethylene (TFE) containing monomers mixtures, in which TFE is mixed with at least one comonomer different from TFE and selected from the group consisting of monomers of classes (a), (c), (d), (e), (f), (g), as above detailed and the followings:
(i) perfluorovinyl ethers containing at least one cyanide group, such as notably those described in patents U.S. Pat. Nos. 4,281,092, 5,447,993 and 5,789,489.

Optionally, the mixture (M) of the present invention also comprises at least one bis-olefin [bis-olefin (OF)] having general formula:

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical, e.g. as described in EP 661304 A (AUSIMONT SPA) 5 Jul. 1995.

The bis-olefin (OF) is preferably selected from the group consisting of those complying with formulae (OF-1), (OF-2) and (OF-3):
(OF-1)

wherein j is an integer between 2 and 10, preferably between 4 and 8, and R1, R2, R3, R4, equal or different from each other, are H, F or $C_{1-5}$ alkyl or (per)fluoroalkyl group;
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a $-(CF_2)_m-$ group, with m being an integer from 3 to 5; a preferred bis-olefin of (OF-2) type is $F_2C=CF-O-(CF_2)_5-O-CF=CF_2$.
(OF-3)

wherein E, A and B have the same meaning as above defined; R5, R6, R7, equal or different from each other, are H, F or $C_{1-5}$ alkyl or (per)fluoroalkyl group.

When present in the mixture (M), the bis-olefin (OF) is present in an amount of 0.01 to 1% moles, with respect to the total amount of monomers of mixture (M).

When the method is used for the manufacture of elastomers, the following mixtures (M) can be advantageously used (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;
(ii) vinylidene fluoride (VDF) 50-80%, perfluoroalkyl vinyl ethers (PAVE) 5-50%, tetrafluoroethylene (TFE) 0-20%, bis-olefin (OF) 0-5%;

(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%, bis-olefin (OF) 0-5%; (iv) tetrafluoroethylene (TFE) 50-80%, perfluoroalkyl vinyl ethers (PAVE) 20-50%, bis-olefin (OF) 0-5%;

(v) tetrafluoroethylene (TFE) 45-65%, $C_2$-$C_8$ non-fluorinated olefins (Ol) 20-55%, vinylidene fluoride 0-30%, bis-olefin (OF) 0-5%;

(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%, bis-olefin (OF) 0-5%;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%;

(ix) tetrafluoroethylene (TFE) 20-70%, fluorovinyl ethers (MOVE) 30-80%, perfluoroalkyl vinyl ethers (PAVE) 0-50%, bis-olefin (OF) 0-5%.

Still, when the mixture (M) is intended for the manufacture via the method of the present invention of a fluoroelastomer, cure-site containing monomers can be used.

Among cure-site containing monomers, mention can be notably made of:

(CSM-1) iodine or bromine containing monomers of formula:

wherein each of $A_{Hf}$, equal to or different from each other and at each occurrence, is independently selected from F, Cl, and H; $B_{Hf}$ is any of F, Cl, H and $OR^{Hf}B$, wherein $R^{Hf}B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a —$(CF_2)_m$— group, with m being an integer from 3 to 5;

(CSM-2) ethylenically unsaturated compounds comprising cyanide groups, possibly fluorinated.

Among cure-site containing monomers of type (CSM1), preferred monomers are those selected from the group consisting of:

(CSM1-A) iodine-containing perfluorovinylethers of formula:

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986); and (CSM-1B) iodine-containing ethylenically unsaturated compounds of formula:

$$CX^1X^2=CX^3-(CF_2CF_2)_p-I$$

wherein each of $X^1$, $X^2$ and $X^3$, equal to or different from each other, are independently H or F; and p is an integer from 1 to 5; among these compounds, mention can be made of $CH_2=CHCF_2CF_2I$, $I(CF_2CF_2)_2CH=CH_2$, $ICF_2CF_2CF=CH_2$, $I(CF_2CF_2)_2CF=CH_2$;

(CSM-1C) iodine-containing ethylenically unsaturated compounds of formula:

$$CHR=CH-Z-CH_2CHR-I$$

wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2=CH-(CF_2)_4CH_2CH_2I$, $CH_2=CH-(CF_2)_6CH_2CH_2I$, $CH_2=CH-(CF_2)_8CH_2CH_2I$, $CH_2=CH-(CF_2)_2CH_2CH_2I$;

(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987.

Among cure-site containing monomers of type (CSM2), preferred monomers are those selected from the group consisting of:

(CSM2-A) perfluorovinyl ethers containing cyanide groups of formula $CF_2=CF-(OCF_2CFXCN)_m-O-(CF_2)_n-CN$, with XCN being F or $CF_3$, m being 0, 1, 2, 3 or 4; n being an integer from 1 to 12;

(CSM2-B) perfluorovinyl ethers containing cyanide groups of formula $CF_2=CF-(OCF_2CFXCN)_{m'}-O-CF_2-CF(CF_3)-CN$, with XCN being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DU PONT) 28 Jul. 1981, U.S. Pat. No. 4,281,092 (DU PONT) 28 Jul. 1981, U.S. Pat. No. 5,447,993 (DU PONT) 5 Sep. 1995 and U.S. Pat. No. 5,789,489 (DU PONT) 4 Aug. 1998

Further, in addition, in the method of the present invention, the aqueous emulsion may additionally comprise anyone of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and alkali metal or alkaline-earth metal iodides and/or bromides, such as described notably in U.S. Pat. No. 5,173,553 (AUSIMONT SRL) 22 Dec. 1992.

Those agents are particularly useful to the aim of including additional iodine and/or bromine cure sites as terminal groups of the polymer (F).

The surfactant used in the method of the invention is generally a fluorinated surfactant. More specifically, fluorinated surfactant [surfactant (FS)] of formula:

wherein $R_{fS}$ is a $C_3$-$C_{30}$ (per)fluoroalkyl chain, which can possibly be linear, cyclic of branched, a $C_3$-$C_{30}$ (per)fluoro (poly)oxyalkylenic chain, which can possibly be linear, cyclic of branched, $X^-$ is $-COO^-$, $-PO_3^-$ or $-SO_3^-$, $M^+$ is selected from $H^+$, $NH_4^+$, an alkaline metal ion and j can be 1 or 2, can be used.

As non limitative example of surfactants (FS), mention may be made of ammonium and/or sodium perfluorocarboxylates, and/or (per)fluoropolyoxyalkylenes having one or more carboxylic end groups.

Other examples of fluorinated surfactants are (per)fluorooxyalkylenic surfactants described in US 2007015864 (3M INNOVATIVE PROPERTIES) 8 Jan. 2007, US 2007015865 (3M INNOVATIVE PROPERTIES CO) 18 Jan. 2007, US 2007015866 (3M INNOVATIVE PROPERTIES CO) 18 Jan. 2007, US 2007025902 (3M INNOVATIVE PROPERTIES CO) 1 Feb. 2007.

More preferably, the surfactant (FS) selected from the group consisting of:
- $CF_3(CF_2)_{n1}COOM'$, in which $n_1$ is an integer ranging from 4 to 10, preferably from 5 to 7, and more preferably being equal to 6; M' represents H, $NH_4$, Na, Li or K, preferably $NH_4$;
- $T(C_3F_6O)_{n0}(CFXO)_{m0}CF_2COOM''$ [formula ($FS_1$)], in which T represents Cl or a perfluoroalkoxyde group of formula $C_kF_{2k+1}O$ with k is an integer from 1 to 3, one F atom being optionally substituted by a Cl atom; $n_0$ is an integer ranging from 1 to 6; $m_0$ is an integer ranging from 0 to 6; M" represents H, $NH_4$, Na, Li or K; X represents F or $CF_3$
- $F-(CF_2-CF_2)_{n2}-CH_2-CH_2-RO_3M'''$, in which R is P or S, preferably S, M''' represents H, $NH_4$, Na, Li or K, preferably H; $n_2$ is an integer ranging from 2 to 5, preferably $n_2$=3;
- A-$R_f$—B bifunctional fluorinated surfactants, in which A and B, equal to or different from each other, are —$(O)_pCFX$—$COOM^*$; $M^*$ represents H, $NH_4$, Na, Li or K, preferably $M^*$ represents $NH_4$; X=F or $CF_3$; p is an integer equal to 0 or 1; $R_f$ is a linear or branched perfluoroalkyl chain, or a (per)fluoropolyether chain such that the number average molecular weight of A-$R_f$—B is in the range 300 to 3,000, preferably from 500 to 2,000;
- $R'_f$—O—$(CF_2)_r$—O-L-COOM', wherein $R'_f$ is a linear or branched perfluoroalkyl chain, optionally comprising catenary oxygen atoms, M' is H, $NH_4$, Na, Li or K, preferably M' represents $NH_4$; r is 1 to 3; L is a bivalent fluorinated bridging group, preferably —$CF_2CF_2$— or —CFX—, X=F or $CF_3$;
- $R''_f$—$(OCF_2)_u$—O—$(CF_2)_v$—COOM'', wherein $R''_f$ is a linear or branched perfluoroalkyl chain, optionally comprising catenary oxygen atoms, M" is H, $NH_4$, Na, Li or K, preferably M" represents $NH_4$; u and v are integers from 1 to 3;
- $R'''_f$—$(O)_t$—CHQ-L-COOM''', wherein $R'''_f$ is a linear or branched perfluoroalkyl chain, optionally comprising catenary oxygen atoms, Q=F or $CF_3$, t is 0 or 1, M''' is H, $NH_4$, Na, Li or K, preferably M''' is $NH_4$; L is a bivalent fluorinated bridging group, preferably —$CF_2CF_2$— or —CFX—, X=F or $CF_3$;

cyclic fluorocompounds of the following formula ($I_{Cy}$):

wherein $X_1$, $X_2$, $X_3$, equal or different from each other are independently selected among H, F, and $C_{1-6}$ (per)fluoroalkyl groups, optionally comprising one or more catenary or non-catenary oxygen atoms; L represents a bond or a divalent group, in particular a divalent fluorinated aliphatic group; $R_F$ is a divalent fluorinated $C_{1-3}$ bridging group; Y is a hydrophilic function selected from the group consisting of those of formulae:

wherein $X_a$ is H, a monovalent metal (preferably an alkaline metal) or an ammonium group of formula —$N(R'_n)_4$, wherein $R'_n$, equal or different at each occurrence, represents a hydrogen atom or a $C_{1-6}$ hydrocarbon group (preferably an alkyl group); these cyclic fluorocompounds being notably described in WO 2010/003929, the content of which is hereby incorporated by reference;

and mixtures thereof.

In certain particularly preferred embodiments of the method of the invention, the emulsion provided in step (i) further advantageously includes an additional non-functional fluorinated fluid.

This technique is particularly advantageous as the addition of certain particular non-functional fluorinated fluid(s) [fluid (F)] can provide for an emulsion comprising dispersed droplets of said fluid having an average size of preferably less than 50 nm, more preferably of less than 40 nm, even more preferably of less than 30 nm. Said nanometric size of droplets is particularly advantageous in that it ensure higher polymerization rates and small fluoropolymer particles.

Said non-functional fluorinated fluid which can be used according to this embodiment are preferably (per)fluoropolyethers comprising recurring units (R1), said recurring units comprising at least one ether linkage in the main chain and at least one fluorine atom (fluoropolyoxyalkene chain). Preferably the recurring units R1 of the (per)fluoropolyether are selected from the group consisting of:

(I) —CFX—O—, wherein X is —F or —CF$_3$; and
(II) —CF$_2$—CFX—O—, wherein X is —F or —CF$_3$; and
(III) —CF$_2$—CF$_2$—CF$_2$—O—; and
(IV) —CF$_2$—CF$_2$—F$_2$—CF$_2$—O—; and
(V) —(CF$_2$)$_j$—CFZ—O— wherein j is an integer chosen from 0 and 1 and Z is a fluoropolyoxyalkene chain comprising from 1 to 10 recurring units chosen among the classes (I) to (IV) here above; and mixtures thereof.

Should the (per)fluoropolyether comprise recurring units R1 of different types, advantageously said recurring units are randomly distributed along the fluoropolyoxyalkene chain.

Preferably the (per)fluoropolyether is a compound complying with formula (I-p) here below:

$$T_1\text{-}(CFX)_p\text{—O—}R_f\text{—}(CFX)_{p'}\text{-}T_2 \quad\quad (I\text{-}p)$$

wherein:
each of X is independently F or CF$_3$;
p and p', equal or different each other, are integers from 0 to 3;
R$_f$ is a fluoropolyoxyalkene chain comprising repeating units R°, said repeating units being chosen among the group consisting of:
(i) —CFXO—, wherein X is F or CF$_3$,
(ii) —CF$_2$CFXO—, wherein X is F or CF$_3$,
(iii) —CF$_2$CF$_2$CF$_2$O—,
(iv) —CF$_2$CF$_2$CF$_2$CF$_2$O—,
(v) —(CF$_2$)$_j$—CFZ—O— wherein j is an integer chosen from 0 and 1 and Z is a group of general formula —OR$_f'$T$_3$, wherein R$_f'$ is a fluoropolyoxyalkene chain comprising a number of repeating units from 0 to 10, said recurring units being chosen among the followings: —CFXO—, —CF$_2$CFXO—, —CF$_2$CF$_2$CF$_2$O—, —CF$_2$CF$_2$CF$_2$CF$_2$O—, with each of each of X being independently F or CF$_3$; and T$_3$ is a C$_1$-C$_3$ perfluoroalkyl group, and mixtures thereof;
T$_1$ and T$_2$, the same or different each other, are H, halogen atoms, C$_1$-C$_3$ fluoroalkyl groups, optionally comprising one or more H or halogen atoms different from fluorine.

Particularly preferred embodiments are those wherein the aqueous emulsion provided in step (i) comprises at least one surfactant (FS), as above detailed, and at least one fluid (F), as above detailed. More specifically, embodiments which are preferred because of their ability to provide for improved reaction rate and for polymer (F) particles of nanometric size are those wherein the aqueous emulsion of step (i) includes:
at least one surfactant (FS) of formula (FS$_1$): T(C$_3$F$_{6O}$)$_{n0}$(CFXO)$_{m0}$CF$_2$COOM", as above detailed; and
at least one fluid (F) of formula (I-p)

$$T_1\text{-}(CFX)_p\text{—O—}R_f\text{—}(CFX)_{p'}\text{-}T_2 \quad\quad (I\text{-}p)$$

as above detailed.

The aqueous emulsion polymerization may be carried out at a temperature between 10 to 150° C., preferably 20° C. to 110° C. and the pressure is typically between 2 and 35 bar, in particular 15 to 30 bar.

The reaction temperature may be varied during the polymerization e.g. for influencing the molecular weight distribution, i.e., to obtain a broad molecular weight distribution or to obtain a bimodal or multimodal molecular weight distribution.

The pH of the polymerization media may be in the range of pH 2-10, preferably 3-9, most preferably 4-8.

The aqueous emulsion polymerization is typically initiated by a radical initiator including any of the initiators known for initiating a free radical polymerization of fluorinated monomers. Suitable initiators include peroxides and azo compounds and redox based initiators. Specific examples of peroxide initiators include hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-alkali- or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit) or fluoroalkyl sulfinates, e.g. as disclosed in U.S. Pat. No. 5,285,002. The reducing agent typically reduces the half-life time of the persulfate initiator. Additionally, a metal salt catalyst such as for example copper, iron or silver salts may be added.

The amount of radical initiator is not particularly limited; nevertheless in order to ensure adequate polymerization kinetics control, it is generally understood that the amount of initiator will be selected so as to achieve a molar ratio between the amount of RAFT/MADIX agent and of radical initiator of between 0.1 to 20, preferably of between 0.5 to 10, most preferably of 0.5 to 5 moles/moles.

The invention further pertains to a latex comprising:
particles of a fluoropolymer [polymer (F)] having at least one end chain of formula (I$_X$):

formula (I$_X$)

with X and Z having the meaning (and preferences) above defined for occurrence of this group in RAFT/MADIX agent; and
at least one surfactant, as above detailed, preferably at least one fluorinated surfactant; and,
optionally, at least an additional non-functional fluorinated fluid, as above detailed.

The latex of the present invention is advantageously obtained by the method as above detailed.

Hence, the recurring units constituting the polymer (F) are those deriving from the monomers above detailed as constituents of mixture (M).

The latex of the invention can be further processed, either by addition of additional ingredients, by post-treatment (e.g. reduction of surfactant (FS) content) or for recovery of polymer (F) by known methods (e.g. coagulation, by addition of electrolytes, freezing techniques or others).

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXAMPLES

Example 1

In a 5 liters reactor equipped with a mechanical stirrer operating at 630 rpm, 3.1 l of demineralized water and 31 ml of a microemulsion, previously obtained by mixing 6.8 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 4.3 ml of a 30% v/v NH4OH aqueous solution, 15.6 ml of demineralized water and 4.3 ml of GALDEN® D02 perfluoropolyether of formula: $CF_3O(CF_2CF(CF_3)O)_n(CF_2O)_mCF_3$ with n/m=20, having average molecular weight of 450, were introduced.

Then 0.25 g of O-ethyl S-(1-methoxycarbonyl ethyl) dithiocarbonate (Rhodixan® A1) as chain transfer agent were introduced, and the reactor was heated and maintained at a set-point temperature of 80° C.; a mixture of tetrafluoroethylene (TFE) (7.5% moles), vinylidene fluoride (VDF) (47.5% moles) and hexafluoropropene (HFP) (45% moles) was then added to reach a final pressure of 19 bar (1.9 MPa). 2.6 g of ammonium persulfate (APS) as initiator were then introduced. Pressure was maintained at set-point of 19 bar by continuous feeding of a gaseous mixture of TFE (11.0% moles), VDF (70.0% moles) and HFP (19.0% moles) up to a total of 500 g, for a total reaction time of 104 minutes, during which additional amounts of O-ethyl S-(1-methoxycarbonyl ethyl)dithiocarbonate in equal portions of 0.25 g, at 10%, 20%, 30%, 40%, 50%, 60%, 70%, 80% and 90% conversion of gaseous mixture, were fed to the reactor, hence totaling 2.5 g of MADIX agent. Then the reactor was cooled, vented and the latex recovered. The latex was frozen at a temperature of −20° C. for 24 hours, recovered at room temperature, separated from the aqueous phase, washed with demineralized water and dried in a convection oven at 90° C. for 16 hours. The composition of the obtained polymer by NMR was found to be the following: 11.5% moles of recurring units derived from TFE; 69.9% moles of recurring units derived from VDF, and 18.6% moles of recurring units derived from HFP. Molecular weight distribution data (Mn, PDI, Mw) as obtained by GPC are summarized in table 1.

Comparative Example 2C

Same procedure of example 1 was followed, but introducing the entire amount (2.5 g) of O-ethyl S-(1-methoxycarbonyl ethyl)dithiocarbonate before heating the mixture and initiating the reaction by addition of initiator.

Example 3

Same procedure as in Ex. 1 was followed, but initially adding 0.75 g of O-ethyl S-(1-methoxycarbonyl ethyl)dithiocarbonate before heating and initiating the polymerization, adding 0.75 g of O-ethyl S-(1-methoxycarbonyl ethyl)dithiocarbonate at 50% conversion of gaseous mixture, and continuing reaction for 66 minutes, until a conversion of 150 g of monomers mixture.

Example 4

Same procedure as in Ex. 3 was followed, but initially adding 0.75 g of O-ethyl S-(1-methoxycarbonyl ethyl)dithiocarbonate before heating and initiating the polymerization, adding 3 additional portions of 0.75 g of O-ethyl S-(1-methoxycarbonyl ethyl)dithiocarbonate at 25%, 50% and 75% conversion of gaseous mixture, and continuing reaction for 128 minutes, until a conversion of 300 g of monomers mixture.

Example 5

Same procedure as in Ex. 3 was followed, but initially adding 0.75 g of O-ethyl S-(1-methoxycarbonyl ethyl)dithiocarbonate before heating and initiating the polymerization, adding 6 additional portions of 0.75 g of O-ethyl S-(1-methoxycarbonyl ethyl)dithiocarbonate at 15%, 30%, 45%, 60%, 75% and 90% conversion of gaseous mixture, and continuing reaction for 128 minutes, until a conversion of 500 g of monomers mixture.

Example 6

Same procedure as in example 1 was followed, but further feeding during polymerization a total of 1.8 g of $CH_2=CH—(CF_2)_6—CH=CH_2$, divided in 8 equal portions, each at 13.5% increase in conversion.

Example 7

In a 5 liters reactor equipped with a mechanical stirrer operating at 630 rpm, 3.1 l of demineralized water and 31 ml of same microemulsion as used in Example 1, were introduced.

Then 0.25 g of 1,7-dithio-2,6-dithia-heptanedioicacid O,O'-diethyl ester were introduced, and the reactor was heated and maintained at a set-point temperature of 80° C.; a mixture of tetrafluoroethylene (TFE) (7.5% moles), vinylidene fluoride (VDF) (47.5% moles) and hexafluoropropene (HFP) (45% moles) was then added to reach a final pressure of 19 bar (1.9 MPa). 2.6 g of ammonium persulfate (APS) as initiator were then introduced. Pressure was maintained at set-point of 19 bar by continuous feeding of a gaseous mixture of TFE (11.0% moles), VDF (70.0% moles) and HFP (19.0% moles) up to a total of 500 g, for a total reaction time of 51 minutes, during which additional amounts of 1,7-dithio-2,6-dithia-heptanedioicacid O,O'-diethyl ester in equal portions of 0.25 g, at 10%, 20%, 30%, 40%, 50%, 60%, 70%, 80% and 90% conversion of gaseous mixture, were fed to the reactor, hence totaling 2.5 g of MADIX agent. Then the reactor was cooled, vented and the latex recovered. The latex was frozen at a temperature of −20° C. for 24 hours, recovered at room temperature, separated from the aqueous phase, washed with demineralized water and dried in a convection oven at 90° C. for 16 hours. Molecular weight distribution data (Mn, PDI, Mw) as obtained by GPC are summarized in table 1.

TABLE 1

| Ex. No | Time min | MADIX/ I* mol/mol | MADIX/ monomers** (% mol) | Reaction rate (g/min) | Molecular weight distribution | | |
|---|---|---|---|---|---|---|---|
| | | | | | Mn | PDI | Mw |
| 1 | 104 | 1.1 | 0.20 | 4.8 | 78792 | 2.5 | 196980 |
| 2C | 282 | 1.1 | 0.20 | 1.8 | 44274 | 6.2 | 274499 |
| 3 | 66 | 0.6 | 0.40 | 2.3 | 26208 | 2.8 | 73382 |
| 4 | 128 | 1.3 | 0.40 | 2.3 | 38296 | 3.3 | 126377 |
| 5 | 211 | 2.2 | 0.40 | 2.4 | 81147 | 3.2 | 259670 |

TABLE 1-continued

| Ex. No | Time min | MADIX/ I* mol/mol | MADIX/ monomers** (% mol) | Reaction rate (g/min) | Molecular weight distribution | | |
|---|---|---|---|---|---|---|---|
| | | | | | Mn | PDI | Mw |
| 6 | 90 | 1.1 | 0.20 | 5.5 | 117805 | 4.4 | 518342 |
| 7 | 51 | 0.8 | | 9.8 | n.d. | n.d. | n.d. |

*molar ratio between total amount of MADIX agent and total amount of radical initiator, expressed as ratio mol/mol
**molar ratio between total amount of MADIX agent and total amount of monomers converted, expressed as molar percentage.

GPC Determinations

Fluoroelastomers were characterized by GPC using instrumentation and conditions as detailed in the Table 2 below, and relevant parameter were determined based on polystyrene standards, taking into account polymer/solvent Mark-Houwink parameters for relevant standard and for fluoroelastomers.

TABLE 2

| | |
|---|---|
| Mobile phase | Tetrahydrofuran (THF) |
| Flow rate | 1.0 mL/min |
| Temperature | 35° C. |
| Injection system | Autosampler mod. Waters 717plus |
| Injection volume | 200 mL |
| Pump | Waters mod. 515 HPLC |
| Column set | Precolumn + 4 Waters Styragel HR: $10^6$, $10^5$, $10^4$ and $10^3$ Å |
| Detector | Waters Refractive Index mod. 2414 |
| Software for data acquisition and processing | Waters Empower 3 |

The invention claimed is:

1. A method for emulsion polymerization of at least one fluoromonomer, said method comprising:
    (i) providing at least one aqueous emulsion comprising:
        at least one surfactant,
        a mixture (M), wherein mixture (M) is a monomer mixture comprising at least one monomer (F), wherein monomer (F) is a fluoromonomer, and optionally at least one additional monomer, and
        at least one RAFT/MADIX agent;
    (ii) initiating the polymerization of said monomer mixture in said aqueous emulsion adding at least one radical initiator;
    (iii) continuing the polymerization by adding additional amounts of said mixture (M) and said RAFT/MADIX agent, until converting a targeted amount of said mixture (M), and
    (iv) terminating the polymerization and recovering a latex of polymer (F), wherein polymer (F) is a fluoropolymer;
    wherein the amount of RAFT/MADIX agent is comprised between 0.05 and 0.5% moles, with respect to the total amount of converted monomers of said monomer mixture, and
    wherein the amount of said RAFT/MADIX agent present in the aqueous emulsion when initiating the polymerization in step (ii) is of at most 50% with respect to the total amount of said RAFT/MADIX agent.

2. The method of claim 1 wherein said RAFT/MADIX complies with any of general formulae (I) and (II):

formula (I)

formula (II)

wherein X is carbon; $R_a$ is a monovalent organic group optionally substituted with one or more hydrophilic groups, $R_b$ is a divalent organic group optionally substituted with one or more hydrophilic groups, and Z is any group that can promote sufficient reactivity of the thiocarbonyl group towards radical addition.

3. The method of claim 2, wherein in formulae (I) and (II), X is a carbon atom, that is to say that the RAFT/MADIX agent complies with any general formulae (I') and (II') herein below:

formula (I')

formula (II').

4. The method of claim 2, wherein:
    $R_a$ is selected from $C_1$-$C_{12}$ alkyl, $C_1$-$C_{12}$ alkoxy, aryl or heteroaryl, each of which may be substituted with one or more hydrophilic groups selected from —$CO_2H$, —$CO_2R$, —CN, —$SO_3H$, —$OSO_3H$, —SOR, —$SO_2R$, —OP(OH)$_2$, —P(OH)$_2$, —PO(OH)$_2$, —OH, —OR, —(OCH$_2$—CHR$^0$ )$_w$—OH, —(OCH$_2$—CHR$^0$ )$_w$—OR, —CONH$_2$, —CONHR$^1$, —CONR$^1$R$^2$, —NR$^1$R$^2$, —NR$^1$R$^2$R$^3$, where R is selected from $C_1$-$C_{12}$ alkyl; w is an integer from 1 to 10; R$^0$ is selected from hydrogen or R; R$^1$, R$^2$ and R$^3$ are independently selected from $C_1$-$C_{12}$ alkyl and aryl which are optionally substituted with one or more hydrophilic substituent selected from —$CO_2H$, —$CO_2R$, —CN, —$SO_3H$, —$OSO_3H$, —$SO_2R$, —OH, —(OCH$_2$CHR$^0$ )$_w$—OH, —CONH$_2$, —SOR and SO$_2$R, and salts thereof, wherein R, R$^0$ and w are as defined above;
    $R_b$ is selected from divalent $C_1$-$C_{12}$ aliphatic, aryl or heteroaryl groups, each of which may be substituted with one or more hydrophilic groups selected from —$CO_2H$, —$CO_2R$, —CN, —$SO_3H$, —$OSO_3H$, —SOR, —$SO_2R$, —OP(OH)$_2$, —P(OH)$_2$, —PO(OH)$_2$, —OH, —OR, —(OCH$_2$—CHR$^0$)$_w$—OH, —(OCH$_2$—CHR$^0$)—OR, —CONH$_2$, —CONHR$^1$, —CONR$^1$R$^2$, —NR$^1$R$^2$, —NR$^1$ R$^2$R$^3$, where R is selected from $C_1$-$C_{12}$ alkyl; w is an integer from 1 to 10; R$^0$ is selected from hydrogen or R; R$^1$, R$^2$ and R$^3$ are independently selected from $C_1$-$C_{12}$ alkyl and aryl which are optionally substituted with one or more hydrophilic substituent selected from —$CO_2H$, —$CO_2R$, —CN, —$SO_3H$, —$OSO_3H$, —$SO_2R$, —OH, —(OCH$_2$CHR$^0$ )$_w$—OH, —CONH$_2$, —SOR and SO$_2$R, and salts thereof, wherein R, R$^0$ and w are as defined above;

Z, equal to or different from each other at each occurrence may be selected among optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy- phosphinyl of formula —P(=O)(OR$^4$)$_2$, dialkyl- or diaryl- phosphinyl of formula —P(=O)R$^4_2$, where R$^4$ is selected from the group consisting of optionally substituted C$_1$-C$_{18}$ alkyl, optionally substituted C$_2$-C$_{18}$ alkenyl, optionally substituted aryl, optionally substituted heterocyclyl, optionally substituted arylalkyl, optionally substituted alkaryl, optionally substituted acylamino, optionally substituted acylimino, optionally substituted amino, a polymer chain formed by any mechanism, for example polyalkylene oxide polymers such as water soluble polyethylene glycol or polypropylene glycol, and alkyl end capped derivatives thereof; optional-substituents for R$^4$ and Z groups include epoxy, hydroxy, alkoxy, acyl, acyloxy, carboxy (and its salts), sulfonic acid (and its salts), alkoxy- or aryloxy- carbonyl, isocyanato, cyano, silyl, halo, and dialkylamino.

5. The method of claim 4, wherein:

R$_a$ is selected from the group consisting of: —CH(CH$_3$)CO$_2$H, —CH(CH$_3$)CO$_2$CH$_3$, —CH(CH$_3$)CO$_2$CH$_2$CH$_3$, —CH(CH$_3$)CO$_2$CH(CH$_3$)$_2$, —CH(CO$_2$H)CH$_2$CO$_2$H, —CH(CO$_2$CH$_3$)CH$_2$CO$_2$CH$_3$, —CH(CO$_2$CH$_2$CH$_3$)CH$_2$CO$_2$CH$_2$CH$_3$, —CH(CO$_2$CH(CH$_3$)$_2$)CH$_2$CO$_2$CH(CH$_3$)$_2$, —C(CH$_3$)$_2$CO$_2$H, —C(CH$_3$)$_2$CO$_2$CH$_3$, —C(CH$_3$)$_2$CO$_2$CH$_2$CH$_3$, —C(CH$_3$)$_2$CO$_2$CH(CH$_3$)$_2$, —CH$_2$(C$_6$H$_5$), —C(CN)(CH$_3$)CO$_2$H, —C(CN)(CH$_3$)(CH$_2$)CO$_2$CH$_3$, —C(CN)(CH$_3$)CO$_2$CH$_2$CH$_3$, —C(CN)(CH$_3$)CO$_2$CH(CH$_3$)$_2$, —C(CN)(CH$_3$)(CH$_2$)$_2$CO$_2$H, —C(CN)(CH$_3$)(CH$_2$)$_2$CO$_2$CH$_3$, —C(CN)(CH$_3$)(CH$_2$)$_2$CO$_2$CH$_2$CH$_3$, and —C(CN)(CH$_3$)(CH$_2$)$_2$CO$_2$CH(CH$_3$)$_2$, R$_b$ is selected from the group consisting of: —(CH$_2$)$_p$—, wherein p is an integer of 1 to 12, —CH(CH$_3$)—CH$_2$—, —CH(C$_2$H$_5$)—CH$_2$—, —CHCO$_2$H—CH$_2$—, —CH(CO$_2$CH$_3$)—CH$_2$—, —CH(CO$_2$CH$_2$CH$_3$)—CH$_2$—, —CH(CO$_2$CH(CH$_3$)$_2$)—CH$_2$—, —CH(CO$_2$H)CH(CO$_2$H)—, —CH(CO$_2$CH$_3$)$_2$)CH(CO$_2$CH(CH$_3$)$_2$)—, —CH(CO$_2$CH$_3$)CH(CO$_2$CH$_3$)—CH(CO$_2$CH$_2$CH$_3$)CH(CO$_2$CH$_2$CH$_3$)—, —(CH$_2$)$_{p'}$—CH(C$_6$H$_5$)—(CH$_2$)$_{p''}$— wherein p' and p", equal to or different from each other, are 0 or an integer of 1 to 6, —(CH$_2$)$_{q'}$—CH(CN)—(CH$_2$)$_{q''}$—, —(CH$_2$)$_{q'}$—C(CN)(CH$_3$)—(CH$_2$)$_{q''}$—, wherein q' and q", equal to or different from each other, are 0 or an integer of 1 to 6; and Z is selected from optionally substituted alkoxy, optionally substituted aryloxy, optionally substituted alkylthio, optionally substituted arylalkylthio, dialkoxy- or diaryloxy- phosphinyl of formula —P(=O)(OR$^4$)$_2$, and dialkyl- or diaryl- phosphinyl of formula —P(=O)R$^4_2$.

6. The method of claim 1, wherein the mixture (M) comprises at least one fluoromonomer selected from the group consisting of:

C$_2$-C$_8$ perfluoroolefins;

C$_2$-C$_8$ hydrogen-containing fluoroolefins;

(per)fluoroalkylethylenes complying with formula CH$_2$=CH—R$_{f0}$, in which R$_{f0}$ is a C$_1$-C$_6$ (per)fluoroalkyl or a C$_1$-C$_6$ (per)fluorooxyalkyl having one or more ether groups;

chloro- and/or bromo- and/or iodo-C$_2$-C$_6$ fluoroolefins;

fluoroalkylvinylethers complying with formula CF$_2$=CFOR$_{f1}$ in which R$_{f1}$ is a C$_1$-C$_6$ fluoro- or perfluoroalkyl;

hydrofluoroalkylvinylethers complying with formula CH$_2$=CFOR$_{f1}$ in which R$_{f1}$ is a C$_1$-C$_6$ fluoro- or perfluoroalkyl;

fluoro-oxyalkylvinylethers complying with formula CF$_2$=CFOX$_0$, in which X$_0$ is a C$_1$-C$_{12}$ oxyalkyl, or a C$_1$-C$_{12}$ (per)fluorooxyalkyl having one or more ether groups;

fluoroalkyl-methoxy-vinylethers complying with formula CF$_2$=CFOCF$_2$OR$_{f2}$ in which R$_{f2}$ is a C$_1$-C$_6$ fluoro- or perfluoroalkyl or a C$_1$-C$_6$ (per)fluorooxyalkyl having one or more ether groups;

functional fluoro-alkylvinylethers complying with formula CF$_2$=CFOY$_0$, in which Y$_0$ is a C$_1$-C$_{12}$ alkyl or (per)fluoroalkyl, or a C$_1$-C$_{12}$ oxyalkyl or a C$_1$-C$_{12}$ (per)fluorooxyalkyl, said Y$_0$ group comprising a carboxylic or sulfonic acid group, in its acid, acid halide or salt form;

fluorodioxoles, of formula:

wherein each of R$_{f3}$, R$_{f4}$, R$_{f5}$, R$_{f6}$, equal or different each other, is independently a fluorine atom, a C$_1$-C$_6$ fluoro- or per(halo)fluoroalkyl, optionally comprising one or more oxygen atom.

7. The method of claim 6, wherein mixture (M) comprises at least one fluoromonomer selected from the group consisting of:

tetrafluoroethylene (TFE), hexafluoropropene (HFP);

vinyl fluoride, 1,2-difluoroethylene, vinylidene fluoride (VDF), trifluoroethylene (TrFE), pentafluoropropylene, and hexafluoroisobutylene;

chlorotrifluoroethylene (CTFE);

fluoroalkylvinylethers complying with formula CF$_2$=CFOR$_{f1}$ in which R$_{f1}$ is —CF$_3$, —C$_2$F$_5$, or —C$_3$F$_7$;

hydrofluoroalkylvinylethers complying with formula CH$_2$=CFOR$_{f1}$ in which R$_{f1}$ is —CF$_3$, —C$_2$F$_5$, or —C$_3$F$_7$;

fluoro-oxyalkylvinylether complying with formula CF$_2$=CFOX$_0$, in which X$_0$ is perfluoro-2-propoxypropyl;

fluoroalkyl-methoxy-vinylethers complying with formula CF$_2$=CFOCF$_2$OR$_{f2}$ in which R$_{f2}$ is —CF$_3$, —C$_2$F$_5$, —C$_3$F$_7$ or —C$_2$F$_5$—O—CF$_3$;

fluorodioxoles, of formula :

wherein each of $R_{f3}$, $R_{f4}$, $R_{f5}$, $R_{f6}$, equal or different each other, is independently —$CF_3$, —$C_2F_5$, —$C_3F_7$, —$OCF_3$, or —$OCF_2CF_2OCF_3$.

8. The method of claim 1, wherein the following combinations of monomers (F) are used as mixtures (M):

(1) mixtures comprising vinylidene fluoride (VDF) and at least one comonomer different from VDF and selected from the group consisting of:
(a) $C_2$-$C_8$ perfluoroolefins;
(b) hydrogen-containing $C_2$-$C_8$ fluoro-olefins;
(c) $C_2$-$C_8$ chloro and/or bromo and/or iodo-fluoroolefins;
(d) (per)fluoroalkylvinylethers (PAVE) of formula $CF_2$=$CFOR_f$, wherein $R_f$ is a $C_1$-$C_6$ (per)fluoroalkyl group;
(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms;
(f) (per)fluorodioxoles having formula:

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom;
(g) (per)fluoro-methoxy-vinylethers (MOVE, hereinafter) having formula:

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H;
(h) $C_2$-$C_8$ non-fluorinated olefins (Ol); and (2) mixtures comprising tetrafluoroethylene (TFE) and at least one comonomer different from TFE and selected from the group consisting of monomers of classes (a), (c), (d), (e), (f), (g), as above detailed and:
(i) perfluorovinyl ethers containing cyanide groups.

9. The method according to claim 1, said method being used for the manufacture of elastomers, wherein mixture (M) is selected from the group consisting of the following mixtures (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;
(ii) vinylidene fluoride (VDF) 50-80%, perfluoroalkyl vinyl ethers (PAVE) 5-50%, tetrafluoroethylene (TFE) 0-20%, bis-olefin (OF) 0-5%;
(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%, bis-olefin (OF) 0-5%;
(iv) tetrafluoroethylene (TFE) 50-80%, perfluoroalkyl vinyl ethers (PAVE) 20-50%, bis-olefin (OF) 0-5%;
(v) tetrafluoroethylene (TFE) 45-65%, $C_2$-$C_8$ non-fluorinated olefins (Ol) 20-55%, vinylidene fluoride 0-30%, bis-olefin (OF) 0-5%;
(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%, bis-olefin (OF) 0-5%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%; and
(ix) tetrafluoroethylene (TFE) 20-70%, fluorovinyl ethers (MOVE) 30-80%, perfluoroalkyl vinyl ethers (PAVE) 0-50%, bis-olefin (OF) 0-5%.

10. The method of claim 9, wherein mixture (M) additionally comprises at least one cure-site containing monomer selected from the group consisting of:
(CSM-1) iodine or bromine containing monomers of formula:

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atoms, optionally fluorinated; $R_{Hf}$ is a branched or straight chain alkyl radical, which can be partially, substantially or completely fluorinated; and $R_{Hf}$ is a halogen atom selected from the group consisting of iodine and bromine; which may be inserted with ether linkages;
(CSM-2) ethylenically unsaturated compounds comprising cyanide groups, optionally fluorinated.

11. The method of claim 1, wherein said aqueous emulsion additionally comprises anyone of:
iodinated and/or brominated chain-transfer agent(s); and
alkali metal or alkaline-earth metal iodides and/or bromides.

12. The method of claim 11, wherein the iodinated and/or brominated chain-transfer agent is selected from compounds of formula $R_f(I)_x(Br)_y$, wherein $R_f$ is a (per)fluoroalkyl or a (per)fluorochloroalkyl containing from 1 to 8 carbon atoms, and x and y are integers between 0 and 2, with $1 \leq x+y \leq 2$.

13. The method of claim 1, wherein said surfactant is a fluorinated surfactant (FS) of formula:

wherein $R_{fS}$ is a $C_3$-$C_{30}$ (per)fluoroalkyl chain, which can be linear, cycliCOr branched, a $C_3$-$C_{30}$ (per)fluoro(poly)oxyalkylenic chain, which can be linear, cycli- COr branched, X⁻ is —COO⁻, —PO₃⁻ or –SO₃⁻, M⁺ is selected from H⁺, NH₄⁺, and an alkaline metal ion, and j is 1 or 2.

14. The method of claim 13, wherein said surfactant (FS) is selected from the group consisting of:

CF₃(CF₂)$_{n1}$COOM', in which $n_1$ is an integer ranging from 4 to 10; M' represents H, NH₄, Na, Li or K;

T(C₃F₆O)$_{n0}$(CFXO)$_{m0}$CF₂COOM", in which T represents Cl or a perfluoroalkoxyde group of formula C$_k$F$_{2k+1}$O wherein k is an integer from 1 to 3, one F atom being optionally substituted by a Cl atom; $n_0$ is an integer ranging from 1 to 6; $m_0$ is an integer ranging from 0 to 6; M" represents H, NH₄, Na, Li or K; and X represents F or CF₃;

F—(CF₂—CF₂)$_{n2}$—CH₂—CH₂—RO₃M''', in which R is P or S, M''' represents H, NH₄, Na, Li or K; and $n_2$ is an integer ranging from 2 to 5;

A-R$_f$—B bifunctional fluorinated surfactants, in which A and B, equal to or different from each other, are —(O)$_p$CFX—COOM*; M* represents H, NH₄, Na, Li or K; X is F or CF₃; p is an integer equal to 0 or 1; and R$_f$ is a linear or branched perfluoroalkyl chain, or a (per)fluoropolyether chain such that the number average molecular weight of A-R$_f$—B is in the range 300 to 3,000;

R'$_f$—O—(CF₂)$_r$—O-L-COOM', wherein R'$_f$ is a linear or branched perfluoroalkyl chain, optionally comprising catenary oxygen atoms, M' is H, NH₄, Na, Li or K; r is 1 to 3; L is a bivalent fluorinated bridging group, and X is F or CF₃;

R"$_f$—(OCF₂)$_u$—O—(CF₂)$_v$—COOM", wherein R"$_f$ is a linear or branched perfluoroalkyl chain, optionally comprising catenary oxygen atoms, M" is H, NH₄, Na, Li or K; and u and v are integers from 1 to 3;

R'''$_f$—(O)$_t$CHQ-L-COOM''', wherein R'''$_f$ is a linear or branched perfluoroalkyl chain, optionally comprising catenary oxygen atoms, Q is F or CF₃, t is 0 or 1, M''' is H, NH₄, Na, Li or K; L is a bivalent fluorinated bridging group, and X is F or CF₃;

cyclic fluorocompounds of the following formula (I$_{cy}$):

(I$_{Cy}$)

wherein X₁, X₂, X₃, equal or different from each other are independently selected from H, F, and C$_{1-6}$ (per)fluoroalkyl groups, optionally comprising one or more catenary or non-catenary oxygen atoms; L represents a bond or a divalent group; R$_F$ is a divalent fluorinated C$_{1-3}$ bridging group; and Y is a hydrophilic function selected from the group consisting of those of formulae:

(1")

(2")

(3")

wherein X$_a$ is H, a monovalent metal or an ammonium group of formula —N(R'$_n$)₄, wherein R'$_n$, equal or different at each occurrence, represents a hydrogen atom or a C$_{1-6}$ hydrocarbon group;

and mixtures thereof.

15. The method according to claim 1, wherein said aqueous emulsion provided in step (i) further includes an additional non-functional fluorinated fluid selected from the group consisting of (per)fluoropolyethers comprising recurring units (R1), said recurring units comprising at least one ether linkage in the main chain and at least one fluorine atom (fluoropolyoxyalkene chain).

16. The method of claim 15, wherein the recurring units (R1) are selected from the group consisting of:
(I) —CFX—O—, wherein X is —F or —CF₃;
(II) —CF₂—CFX—O—, wherein X is —F or —CF₃;
(III) —CF₂—CF₂—CF₂—O—;
(IV) —CF₂—CF₂—CF₂—CF₂—O—; and
(V) —(CF₂)$_j$—CFZ—O—wherein j is an integer chosen from 0 and 1 and Z is a fluoropolyoxyalkene chain comprising from 1 to 10 recurring units chosen among the classes (I) to (IV); and mixtures thereof.

17. The method of claim 1, wherein the aqueous emulsion polymerization is initiated by a radical initiator selected from peroxides and azo compounds and redox based initiators.

* * * * *